US012566828B2

(12) United States Patent
Bosch et al.

(10) Patent No.: US 12,566,828 B2
(45) Date of Patent: Mar. 3, 2026

(54) MINIMIZING DATA EXPOSURE IN API RESPONSES

(71) Applicant: Cisco Technology, Inc., San Jose, CA (US)

(72) Inventors: Hendrikus G. P. Bosch, Aalsmeer (NL); Alessandro Duminuco, Milan (IT); Zohar Kaufman, South Natanya (IL)

(73) Assignee: Cisco Technology, Inc., San Jose, CA (US)

( * ) Notice: Subject to any disclaimer, the term of this patent is extended or adjusted under 35 U.S.C. 154(b) by 225 days.

(21) Appl. No.: 17/854,180

(22) Filed: Jun. 30, 2022

(65) Prior Publication Data

US 2024/0004973 A1 Jan. 4, 2024

(51) Int. Cl.
*G06F 21/31* (2013.01)
(52) U.S. Cl.
CPC .................................... *G06F 21/31* (2013.01)
(58) Field of Classification Search
CPC ........................................................ G06F 21/31
See application file for complete search history.

(56) References Cited

U.S. PATENT DOCUMENTS

| | | | | |
|---|---|---|---|---|
| 10,664,615 | B1 * | 5/2020 | Schenkein | .......... G06F 21/6245 |
| 11,170,099 | B1 * | 11/2021 | Sandall | ................... G06F 9/547 |
| 11,354,387 | B1 * | 6/2022 | Pereira | ................ G06F 21/6218 |
| 11,785,102 | B1 * | 10/2023 | Boyapati | .............. H04W 48/18 |
| | | | | 709/203 |
| 2012/0311671 | A1 * | 12/2012 | Wood | ...................... H04L 63/08 |
| | | | | 726/4 |
| 2014/0331297 | A1 | 11/2014 | Innes et al. | |
| 2015/0271207 | A1 | 9/2015 | Jaiswal et al. | |
| 2018/0062858 | A1 | 3/2018 | Xu et al. | |
| 2019/0166277 | A1 * | 5/2019 | Oikawa | ............. H04N 1/00244 |
| 2019/0377886 | A1 * | 12/2019 | Roy | ...................... H04L 9/0861 |
| 2020/0117523 | A1 * | 4/2020 | Morrison | ................ G06F 9/547 |
| 2021/0099573 | A1 | 4/2021 | Van Rensburg et al. | |
| 2021/0319034 | A1 * | 10/2021 | Bern | ..................... G06F 16/185 |
| 2022/0334901 | A1 * | 10/2022 | Ruiz | ........................ H04L 43/50 |

* cited by examiner

*Primary Examiner* — Hany S. Gadalla
(74) *Attorney, Agent, or Firm* — Baker Botts L.L.P.

(57) ABSTRACT

The present disclosure is directed to systems and methods for minimizing data exposure in API responses and includes the performance of operations and/or the steps of receiving, from a client, a request for a data object from an API, wherein the data object comprises one or more data elements; identifying a client type associated with the client; receiving, from the API, a response to the request from the client; and modifying the response based on the identified client type.

20 Claims, 4 Drawing Sheets

Start

Method 300

Step 310
receiving, from a client, a request for a data object from an API, wherein the data object comprises one or more data elements Step 320
identifying a client type associated with the client Step 330
receiving, from the API, a response to the request from the client Step 340
modifying the response based on the identified client type End Step 310

Step 320

Step 330

Step 340

MINIMIZING DATA EXPOSURE IN API RESPONSES

TECHNICAL FIELD

The present disclosure generally relates to application programming interfaces (APIs), and furthermore to systems and methods for minimizing data exposure in API responses.

BACKGROUND

When an application exposes an API, the API raises potential security risks depending on the API definition and implementation. Open Web Application Security Project (OWASP) Top provides a list of the ten top security issues for APIs. The OWASP Top 10 includes API3:2019, Excessive Data Exposure. In looking forward to generic implementations, developers tend to expose all object properties without considering their individual sensitivity, relying on clients to perform data filtering before displaying objects to a user. An API may inadvertently expose data that should not be exposed.

DESCRIPTION OF EXAMPLE EMBODIMENTS

Overview

Figure 1:
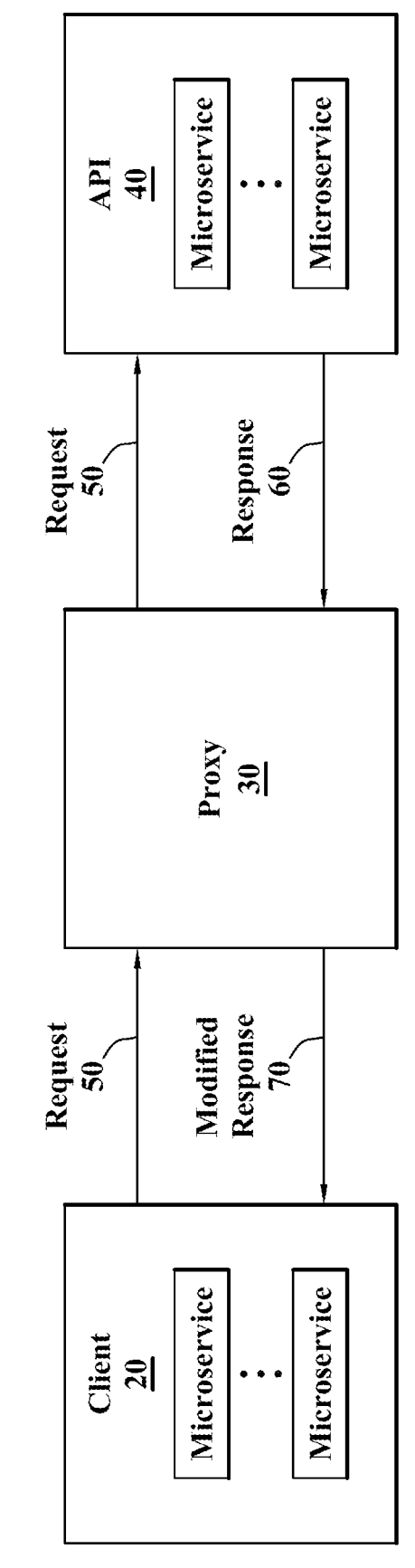
FIG. 1 illustrates a system for minimizing data exposure in API responses, in accordance with certain embodiments.

According to an embodiment, a system may include one or more processors and one or more computer-readable non-transitory storage media comprising instructions that, when executed by the one or more processors, cause one or more components of the system to perform operations including, receiving, from a client, a request for a data object from an API, where the data object comprises one or more data elements; identifying a client type associated with the client; receiving, from the API, a response to the request from the client; and modifying the response based on the identified client type.

Moreover, identifying a client type may include receiving credentials from the client and performing an authentication procedure to identify the client type. The authentication procedure may be performed based on the client being an external client. In an embodiment, identifying a client type may include determining that the client uses at least one of the data elements. In an embodiment, identifying a client type may include determining that the client provides data elements to one or more microservices.

Further, modifying the response may include editing unused data elements. In an embodiment, modifying the responses may include removing optional data elements from the response or replacing mandatory data elements in the response.

According to another embodiment, a method may include the steps of receiving, from a client, a request for a data object from an API, and the data object comprises one or more more data elements; identifying a client type associated with the client; receiving, from the API, a response to the request from the client; and modifying the response based on the identified client type.

According to yet another embodiment, one or more computer-readable non-transitory storage media may embody instructions that, when executed by a processor, cause the performance of operations, including receiving, from a client, a request for a data object from an API, and the data object comprises one or more data elements; identifying a client type associated with the client; receiving, from the API, a response to the request from the client; and modifying the response based on the identified client type.

Technical advantages of certain embodiments of this disclosure may include one or more of the following. The systems and methods described herein may allow a single API endpoint to support different caller types without exposing unnecessary data and creating security risks when the API is exposed. According to the present disclosure, separation of data minimization to an external proxy may allow developers to define and implement APIs without the inclusion of data minimization or other security functionality, which may remain transparent to developers. The present disclosure may allow customized API responses for different caller types, including caller types identified by application tracing. The present disclosure may further allow minimization of data exposure that is transparent to the client. The present disclosure may also allow integration of caller type identification into authentication and authorization mechanisms, whether based on the proxy configuration or external authorization services.

Other technical advantages will be readily apparent to one skilled in the art from the following figures, descriptions, and claims. Moreover, while certain advantages have been enumerated above, various embodiments may include all, some, or none of the enumerated advantages.

Example Embodiments

An API can include at least an interface and an endpoint for the API (the service endpoint). The interface can be captured by an Interface Definition Language (IDL), such as OpenAPI or gRPC. A server implements an API and serves the API endpoint. Ideally, when an API receives a request from a client, an API endpoint should return a data object that contains only data elements the caller needs. API endpoints, however, are often designed for multiple caller types to facilitate interoperability, stability, and standardization. Further, some programmers try to cut corners and build a single API service to encompass a plurality of interactions to avoid tailoring code for the specific purpose. APIs are commonly used by different caller types, each of which may need a different set of data elements. Flexible API endpoints support caller types and use cases that are often unforeseeable at the time of API design to increase API longevity and minimize API modification. Custom API endpoints for each caller type are not feasible, particularly when data elements requested by different caller types commonly overlap. Accordingly, there is a need for API specialization that permits an API, or the service architecture to identify and respond to different caller types in a manner transparent to API development and implementation.

According to embodiments of the disclosed subject matter, a client can interact with the server through an API and uses the IDL to format messages and uses a network connection to connect to the endpoint. Accordingly, a client sends a request to a server through its endpoint, the server receives the request and interprets the request, the server then processes the request for the data objects, the server prepares the response and sends it to the client, and the client receives the response and unmarshals the response. FIG. 1 depicts a system 10 for minimizing data exposure in API responses, according to the present disclosure. System 10 may include client 20. In an embodiment, client 20 may be implemented as a piece of computer hardware or software and may access services made available by API 40. For example, client 20 may request services from API by connecting to a server via a web browser and furthermore by connecting over APIs, such as but not limited to, OpenAPI, gRPC, GraphQL, and REST. In an embodiment, client 20 may implement one or more microservices. Client 20 may communicate data objects or data elements to one or more microservices. In an embodiment, microservices implemented by client 20 or receiving data objects or data elements from client 20 may communicate over a network. Microservices may be implemented in a hardware- and software-agnostic manner; that is, services can be implemented in different programming languages, databases, and devices. In an embodiment, client 20 may implement, or communicate with, microservices as part of a service-oriented architecture (SOA). In an embodiment, client 20 may implement, or communicate with, microservices as part of a representational state transfer (REST). The microservice can be either a client or a service, but not an independent third party.

Client 20 may be configured to communicate with proxy 30. In an embodiment, client 20 sends request 50 to proxy 30 and receives modified response 70 from proxy 30 in response to request 50. Request 50 may be any request for services or information from API 40. For example, request 50 may request a data object, containing one or more data elements, from an API. In an embodiment, client 20 may be configured to route request 50 to proxy 30, which may perform various proxy services, such as authentication and authorization services, monitoring and filtering services, translation or conversion services, security services, or privacy services (e.g., anonymization of services). Upon receipt of modified response 70, client 20 may use a data object or one or more data elements of a data object. Client 20 may use some, but not all, data elements contained in modified response 70. Client 20 may communicate modified response 70, or a data object or data element contained in modified response 70, to one or more microservices. In an embodiment, client 20 may further modify a data object or data element contained in modified response 70 before communicating the modified data object or data element to a microservice. Modified response 70 is discussed further below.

In an embodiment, client 20 may correspond to one or more client types. For example, client 20 may be an external client, such that client 20 is not trusted by proxy 30 and/or API 40. As another example, client 20 may be an authenticated or authorized client, based on prior authentication or authorization by proxy 30 or an authentication service. In an embodiment, client may be an internal client (such that client 20 is trusted by proxy 30 and/or API 40), and microservices implemented by client 20, or microservices communicating with client 20, may be accessible to other elements of system 10. The client type for client 20 may be determined based on the microservices implemented by or communicating with client 20. In an embodiment, client type for client 20 may be determined based on the data objects or data elements provided to microservices implemented by or communicating with client 20. For example, a location-based client type may be determined based on client 20 providing a data element "GPS location" to a microservice that provides location-based services.

In an embodiment, the client type for client 20 may be determined based on the services requested by client 20. In an embodiment, client type may be determined by one or more data objects requested by client 20 in one or more requests. For example, client 20 may request a data object "userid" that contains data elements "username," "email address," and "telephone number," and client 20 may be associated with a client type for directory services based on the requested data object, or particular data elements within the "requested" data object. In an embodiment, the client type of client 20 may be determined based on data elements used by client 20. For example, client 20 may request a data object "userid" that contains data elements "username," "email address," and "telephone number," and "GPS location," and client 20 may be associated with a client type for location-based services based on client 20's use of data elements "username" and "GPS location." In an embodiment, client 20 may provide credentials to facilitate identification of its client type. Client 20 may provide credentials in request 50 or in a separate communication. In an embodiment, client type may be identified by credentials provided apart from request 50 by an authentication or authorization service. In an embodiment, client 20 may provide credentials, in request 50 or in a separate communication, for a microservice implemented by or communicating with client 20 to facilitate identification of client type. In an embodiment, client type may be identified by microservice credentials provided apart from request 50 by an authentication or authorization service.

The system 100 may further include proxy 30. In an embodiment, proxy 30 may be implemented as a server application. For example, client 20 may communicate request 50 to proxy which may determine which API will fulfill request 50, then route request 50 to API 40 upon selection. In an embodiment, proxy 30 may be implemented in a service mesh. For example and not for limitation, the proxy 30 may be implemented in an Istio service mesh as an Envoy proxy and furthermore be implemented with an eBPF plugin or a bespoke proxy. In an embodiment, proxy 30 may be a cloud-native application. For example, proxy 30 may be implemented as a Kubernetes container. In an embodiment, client 20, proxy 30, and API 40 may be implemented in a serverless computing architecture.

In an embodiment, proxy 30 may be configured to intercept all API requests and responses to and from a particular API server. As an example, proxy 30 may intercept request 50 and response 60 as communicated between client 20 and API 40. Proxy 30 may receive requests from and communicate responses to client 20. For example, proxy 30 may receive request 50 from client 20 specifying a request for a data object (containing one or more data elements) from API Proxy 30 may communicate requests to and receive responses from API 40. For example, proxy 30 may communicate request 50 to API 40 and modified response 70 to client 20. In an embodiment, proxy 30 may modify request 50 before routing the modified request/response to API 40. In an embodiment, proxy 30 may select between various available APIs and select API 40 to fulfill a request. In an embodiment, request 50 may identify API 40 as the destination API for request 50, and proxy 30 may route request 50 to API 40 after performing various proxy services.

Proxy 30 may provide various proxy services. In an embodiment, proxy 30 may provide conversion or translation services for compatibility with communications protocols. For example and with reference to FIG. 1, the proxy 30 may be configured to receive request 50 from client 20 according to any standard protocol and convert request 50 for communication to API 40 according to any standard protocol. Similarly, proxy 30 may be configured to receive response 60 forwarded from API 40 according to any standard protocol and convert response 60 to modified response 70 for communication to client 20 according to any standard protocol. In an embodiment, proxy 30 may provide authentication and authorization services as part of identity and access management. For example, proxy 30 may be configured to authenticate and/or authorize request 50. In an embodiment, proxy 30 may authenticate request 50 for communication to API 40. In an embodiment, proxy 30 may facilitate authentication and authorization services by communicating request 50 to another service, such as an authentication server. Proxy 30 may receive an authenticated request from an authentication or authorization service (not shown in FIG. 1) and communicate the authenticated request to API 40. In an embodiment, proxy 30 may reject a request 50 when authentication or authorization fails.

In an embodiment, proxy 30 may provide monitoring and filtering services. For example, proxy 30 may control content in request 50 or response 60. In an embodiment, proxy 30 may log information related to traffic flow between clients and APIs. Proxy 30 may perform statistical or content-based analysis of requests and responses and implement policies regarding malicious content or network performance. For example, proxy 30 may block or reject a malicious request 50 to API 40. In an embodiment, proxy 30 may provide security or privacy services. For example, proxy 30 may encrypt requests or responses. Proxy 30 may route requests or responses to other proxies to maintain privacy or security.

In an embodiment, proxy 30 may be configured to identify a client type associated with the client. Proxy 30 may identify client type for client 20 based on the services requested by client 20. In an embodiment, proxy 30 may identify client type by determining one or more data objects requested by client 20 in one or more requests. Proxy 30 may identify a client type upon intercepting request 50. Proxy 30 may receive credentials to facilitate identification client type, from client 20, another proxy, or an external authentication and authorization service. Proxy 30 may receive credentials from client 20 in request 50 or in a separate communication. In an embodiment, proxy 30 may receive credentials for one or more microservices implemented by or in communication with client 20. In an embodiment, proxy 30 may identify client type based on data elements used by client 20. Proxy 30 may identify client type based on data objects requested by client 20. In an embodiment, proxy 30 may identify client type for client 20 based on microservices implemented by or in communication with client 20. In an embodiment, proxy 30 may be configured to implement multiple modes of client identification. For example, proxy 30 may identify client 20 as a web-based, location-services client based on a request 50 for data elements "GPS location" and "Bluetooth connections" received from a web browser. As another example, proxy 30 may identify client 20 as an internal client based on credentials for client 20 received from an authorization service and implementation of a user-directory microservice. Similarly, proxy 30 may identify client 20 as an external client based on the lack of credentials. In an embodiment, proxy 30 may identify more than one client type associated with client 20. For example, proxy 30 may identify client 20 for location-based services and targeted-advertising services.

In an embodiment, proxy 30 may be configured to identify a client type based on authentication or authorization mechanisms. Proxy 30 may identify a client type based on authentication or authorization mechanisms for internal or external clients. In an embodiment, proxy 30 may perform an authentication procedure to identify a client type based on the client being an external client. Proxy 30 may identify a client type based on password-based, token-based, multi-factor, or trustless authentication or authorization mechanisms. For example, proxy may identify a client type based on accessing a distributed ledger to authenticate client 20. Proxy 30 may be configured to perform authentication or authorization services with received credentials for client 20, or for a microservice implemented by or in communication with client In an embodiment, proxy 30 may receive a password, code, token, biometric data, certificate, or signature as credentials. In an embodiment, proxy 30 may map client 20 to a specific caller type as part of an authentication or authorization procedure. For example, proxy 30 may receive credentials from client 20, communicate the credentials to an external authorization server, and identify a client type for client 20 based on data received from the external authorization server. In an embodiment, proxy 30 may receive authentication credentials from another proxy or an authentication service, rather than from client 20. For example, proxy 30 may receive credentials for client 20 from an authentication service and map client 20 to a specific client type based on the received credentials. In an embodiment, proxy 30 may identify client type by communicating with an API gateway that performs authentication or authorization. For example, proxy 30 may request client identity in an authentication request to an API gateway. In another embodiment, proxy 30 may identify client type based on a query of the source ASN, IP address, certificates and the like, which can include identifying information. For example, an IP address may be identified as on a trusted client network that can identify the client type.

In an embodiment, proxy 30 may be configured to identify a client type by identifying the microservice from which the request originated. Proxy 30 may identify an originating microservice for internal clients (e.g., clients deployed internally to the organization implementing an API server, such that microservices implemented by or in communication with client 20 are accessible to proxy 30). Proxy 30 may identify a client type based on data elements used by an originating microservice. In an embodiment, proxy 30 may identify a client type based on authentication or authorization mechanisms for an originating microservice.

In an embodiment, proxy 30 may identify a client type by determining that the client provides and consumes the one or more data elements to one or more microservices. In an embodiment, proxy 30 may be configured to identify a client type by identifying the microservices that receive, communicate, or use data elements contained in the response. Proxy 30 may determine that one or more microservices use one or more data elements in response 60. In an embodiment, proxy 30 may modify or edit response 60 to generate modified response 70 by removing unused data elements. For example, proxy 30 may remove data element "physical address" from response 60, to generate modified response 70, based on a determination that no microservices receiving data elements in the response use the data element "physical address." In an embodiment, proxy 30 may modify response 60 to generate modified response 70 by editing unused data elements. For example, proxy 30 may insert a random date into data element "date of birth" in response 60 based on a determination that microservices that receive, communicate, and use the response do not use data element "date of birth." This can be driven by a template such as built up by scanning the code of the client, or by way of a SecOps engineer enforcing enterprise policies.

In an embodiment, proxy 30 may be configured to modify response 60. For example, proxy 30 may modify response 60 by removing one or more optional data elements. In an embodiment, proxy 30 may modify response 60 by replacing mandatory data elements. In an embodiment, proxy 30 may modify response 60 to generate modified response 70 and communicate modified response 70 to client 20. In an embodiment, proxy 30 may modify response by editing data elements not used by client 20. Proxy 30 may edit a data element by removing the data element or replacing the data element and may furthermore encrypt, replace with a unique value, or otherwise obfuscate the fields that should not be exposed. For example, proxy 30 may receive from API 40 a response 60 containing data elements "username," "email," and "password," and proxy 30 may remove data element "password" based on an external client type. In an embodiment, proxy 30 may modify response 60 by editing a data object based on the identified client type. Proxy 30 may edit a data object by removing or obfuscating data elements from the data object, replacing data elements within the data object, adding data elements to the data object, moving data elements between data objects in response 60, or replacing the name or other data associated with the data object in response 60. Embodiments of the disclosed subject matter further contemplate scenarios when the server needs a given field for subsequent requests. In such example, a customer record such as "Jane Doe" can be requested by the client, the proxy forwards the request to the server, and the server responds to the proxy. For the server response, the proxy can replace the customer record of "Jane Doe" with a universally unique identifier (UUID) that is forwarded to the client. If the client requests for all information on the UUID, the proxy can replace the UUID with "Jane Doe" and the server can respond with the data. Any sensitive data can be replaced by the proxy in the response. Modification of API responses by proxy 30 is discussed further below with respect to FIG. 2.

In an embodiment, proxy 30 may be configured to modify response 60 based on the identified client type. For example, proxy 30 may receive response 60—including data object "userid" containing data elements "username," "email address," and "date of birth"—from API 40 in response to a request "GET /users/{userid}," and proxy 30 may replace "date of birth" with a random date based on identification of a client type for targeted-advertising services. As another example, proxy 30 may receive a response 60 containing data elements "username," "physical address," and "GPS location," and proxy 30 may remove data element "username" before communicating modified response 70, containing data elements "physical address" and "GPS location" to a client 20 identified as a location-services client type. In an embodiment, proxy 30 may identify more than one client type associated with client 20. Proxy 30 may modify response based on one or more identified client types. For example, proxy 30 may receive data elements "username," "GPS location," "Posted Content," and "Posted Content Timestamp" in response 60 and may remove data elements "username" and "GPS location" based on identifying an external client type for content-delivery services.

The system 100 may further include API 40. In an embodiment, API 40 may be a piece of computer hardware or software and may provide services made available to client 20. For example, API 40 may provide services to client 20 via proxy 30. API 40 may be a public, private, or partner API. In an embodiment, API 40 may be a composite API to permit client 20 to access multiple services in a single request. In an embodiment, API 40 may be a web-API. API 40 may provide web services. In an embodiment, API 40 may include an API endpoint to manage and interface with API resources such as but not limited to OpenAPI, gRPC, GraphQL, and REST. In an embodiment, API 40 may be a cloud-native application.

In an embodiment, API 40 may be implemented by one or more microservices. In an embodiment, API 40 implemented by microservices or providing data objects or data elements to API 40 may communicate over a network. Microservices may be implemented in a hardware- and software-agnostic manner; that is, services can be implemented in different programming languages and devices. In an embodiment, API 40 may communicate with microservices as part of a service-oriented architecture (SOA). Microservices providing data objects or data elements to API 40 may be containerized. In an embodiment, API 40 may be implemented, or communicated with, microservices as part of a representational state transfer (REST) and adaptation such as but not limited to OpenAPI. The proxy may be implemented by an API gateway that manages the microservice architecture in API 40 and routes requests to microservices or can be hosted separately.

A client and a server using and implementing API 40 may be configured to communicate with proxy 30. In such embodiment, the communication can be according to standard protocols, such as HTTP, or over a network. API 40 may be implemented on a server accessed by client 20 via proxy 30.

In an embodiment, API 40 receives request 50 from proxy 30 and sends response to proxy 30 in response to request 50. Request 50 may be provided to one or more microservices implemented by or in communication with API 40. Request 50 may be any request for services from API 40. For example, request 50 may request a data object, containing one or more data elements, from an API. In an embodiment, API 40 may receive request 50 from proxy 30, after proxy 30 intercepts request 50 from client 20.

In an embodiment, proxy 30 may receive response 60 from one or more microservices implemented by or in communication with API 40. Response 60 may contain one or more data objects, with each data object including one or more data elements. API 40 may communicate response 60 to proxy 30, which may modify response 60 to generate modified response 70 for communication to client 20. API 40 may communicate response 60 to proxy 30 in a transparent manner. In an embodiment, proxy 30 may communicate modified response 70 to client 20 in a transparent manner, such that client 20 does not obtain data regarding API 40, microservices implemented by or in communication with API 40, or certain data objects or data elements in response 60.

In an embodiment, system 10 including the client, proxy and servers may be implemented by containers, serverless functions, virtual machines, hardware and the Internet of Things, and bespoke implementations. Client 20, proxy 30, and API 40 may request and provide services in a serverless manner. Client 20, proxy 30, and API 40 may communicate over a network.

In operation, client 20 may communicate a request 50 to proxy 30 for services provided by API 40. Proxy 30 may intercept request 50 and select one or more APIs to service request 50. API 40 may route response 60 to proxy 30 for proxy services. Proxy 30 may modify request 60 before communicating a modified request 70 to client 20. The request 50 may be modified based on the identified client type. Request 50 may request a data object containing one or more data elements from API 40. For example, request 50 may request a data object "UserLocation" containing data elements "username," "physical address," "billing address," and "GPS location."

Proxy 30 may identify a client type associated with client 20. Proxy 30 may identify a client type by identifying the microservice from which request 50 originated. Proxy 30 may identify a client type by determining that the client provides the one or more data elements to one or more microservices. Furthermore, proxy 30 may identify a client type based on authentication mechanisms, authorization mechanisms, or other mechanisms noted herein. Proxy 30 may perform an authentication procedure to identify a client type. For example, proxy 30 may receive request and obtain credentials from client 20 as part of request 50. Proxy 30 may map client 20 to a client type that is trusted for financial services as part of an authentication or authorization procedure and communicate data element "billing information" in a modified response 60 to client based on client 20 being trusted for financial services.

Proxy 30 may receive a response 60 to request 50 from API 40. Response 60 may contain a data object, including one or more data elements, requested by client 20 in request 50. For example, response 60 may contain data object "UserLocation," including data elements "username," "physical address," "billing address," and "GPS location," based on request 50 requesting the data object "UserLocation." Response 60 may contain a data object, including one or more data elements, in response to a modified request received from proxy 30. For example, response 60 may contain data object "UserLocation," including data elements "username," "physical address," and "GPS location," based on receiving a modified request from proxy 30 requesting the data object "UserLocation," but not the data element "billing address." As another example, API 50 may receive request 50 from proxy 30 without modification and communicate response 60 containing data object "UserLocation," including data elements "username," "physical address," "billing address," and "GPS location," in response.

Proxy 30 may modify response 60 based on the identified client type. Proxy 30 may communicate modified response 70 to client 20. For example, proxy 30 may map client 20 to a client type that is trusted for financial services as part of an authentication or authorization procedure and communicate modified response 70 containing data elements "username" and "billing address," but not data elements "physical address" or "GPS location," in a modified response 60 to client 20 based on client 20 being trusted for financial services. As another example, proxy 30 may map client 20 to a client type for mapping services, based on client 20 implementing a mapping microservice, and communicate modified response 70 containing data elements "physical address" or "GPS location," but not data elements "username" and "billing address," in a modified response 60 to client 20 based on identifying a mapping services client type.

The steps described above may dynamically minimize data exposure in API responses, and API requests and responses may be modified through proxy 30.

In sum, in accordance with the system 10 of FIG. 1 as described above, proxy 30 may intercept communications between client 20 and API 40, identify a client type associated with client 20, and modify the communications based on the identified client type. Proxy 30 may identify a client as part of an authentication procedures, authorization procedure, or other mechanisms, by determining data objects or data elements used by the client, identifying microservices (whether implemented internal or external to the client) that receive, communicate, or use data elements.

Figure 2:
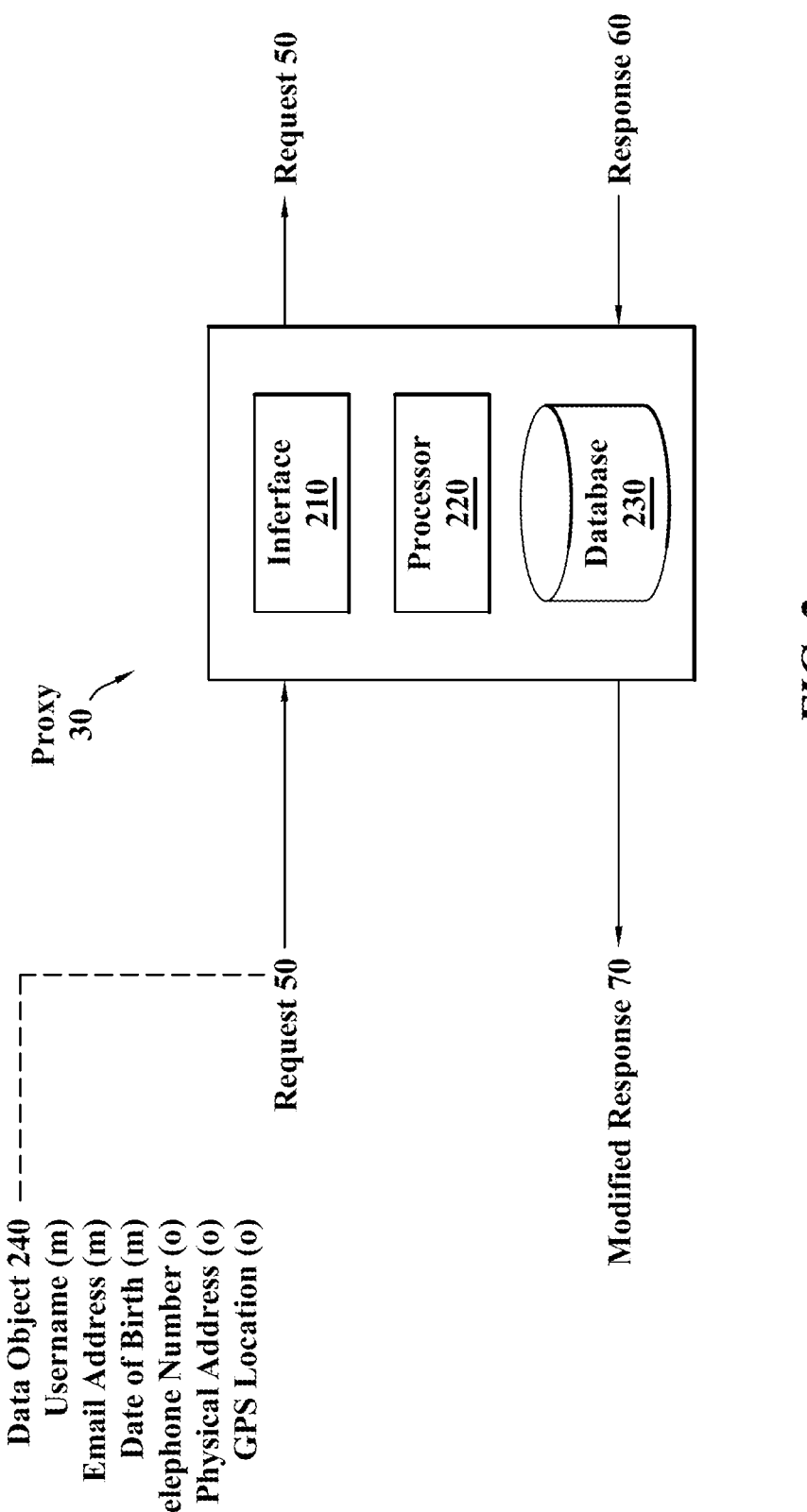
FIG. 2 illustrates a detailed view of the proxy of FIG. 1, in accordance with certain embodiments.

Reference is now made to FIG. 2, which shows a detailed view of the proxy of FIG. 1, according to the present disclosure. As shown, proxy 30 includes interface 210, processor 220, and database 230. Proxy 30 may receive request 50 at interface 210. As previously noted, request 50 from client 20 of a data object 230 may include mandatory data elements and optional data elements. For purposes of example and not for limitation, the mandatory data elements may include "username," "email address," and "date of birth," and the optional data elements may include the "telephone number," "physical address," and "GPS location." The interface 210 facilitates communication between processor 220 and devices external to proxy 30, or between other components of proxy 30 and components of system 10 over a network. Furthermore, interface 210 may be located in proxy 30, another proxy, an external server, other components of system 10, or any other location suitable for interface 210 to communicate with proxy 30. The interface 210 can communicate with network components in a number of suitable ways and with other components networked to the client 20. In one example (not for limitation) with API architecture styles such as OpenAPI and REST, the client selects the network endpoint of the API, such as api. acme.com, in their application and the domain name system (DNS) server resolves this address as data set/IP address 1.2.3.4/32 for example. The client sets up a transmission control protocol (TCP) session to 1.2.3.4/32, which is actually the proxy. The proxy connects the TCP session, and responds to the client to establish the session. The client authenticates to the server by setting up a TLS session. The client sends the API architecture style request (i.e. OpenAPI/ REST/HTTP) to the proxy where the proxy opens up the session, finds the request, performs its masquerading functions (as necessary and as described by the embodiments herein) and sets up a TLS (opt) and TCP session with the server. The proxy forwards the possibly modified request to the server and the server responds to proxy and proxy executes its masquerading functions as described herein to limit data exposure. The proxy responds to the client with the updated request. If the sessions end, all TCP sessions are cleared.

In an embodiment, interface 210 may be configured to receive communication requests and responses according to standard communications protocols. For example, network interface 210 may receive a communication request according to a time-division multiplexing (TDM) protocol or other protocols. In an embodiment, interface 210 may be configured to transmit requests and responses according to standard communications protocols.

Processor 220 may represent or include any form of processing components, including dedicated microprocessors, general-purpose computers, or other devices capable of processing electronic information. Examples of processor 220 include field-programmable gate arrays ("FPGAs"), programmable microprocessors, digital signal processors ("DSPs"), application-specific integrated circuits ("ASICs"), and any other suitable specific- or general-purpose processors. Although FIG. 2 illustrates, for the sake of simplicity, an embodiment of proxy that includes a single processor 220, proxy 30 may include any number of processors 220 configured to interoperate in any appropriate manner.

In an embodiment, processor 220 may facilitate proxy services that can handle requests from a number of clients, modify requests, and assist with potential overloading of the server.

Database 230 represents a database that stores, either permanently or temporarily, characteristics and data associated with a request from a client or a response from an API. Database 230 includes any one or a combination of volatile or non-volatile local or remote devices suitable for storing information. For example, database 230 may include random access memory ("RAM"), read only memory ("ROM"), magnetic storage devices, optical storage devices, or any other suitable information storage device or a combination of these devices. Database 230 may include any suitable information for use in the operation of proxy 30 and the database 230 can contain templates that permit the proxy to function. Additionally, database 230 may be included within proxy 30, rather than being a component external to proxy 30. Database 230 may be located in proxy 30, another proxy, an external server, other components of system 10, or any other location suitable for database 230 to communicate with proxy 30. The database 230 may furthermore include and store supplemental data that may be associated with the requests and responses or may be associated with the proxy services.

Figure 3:
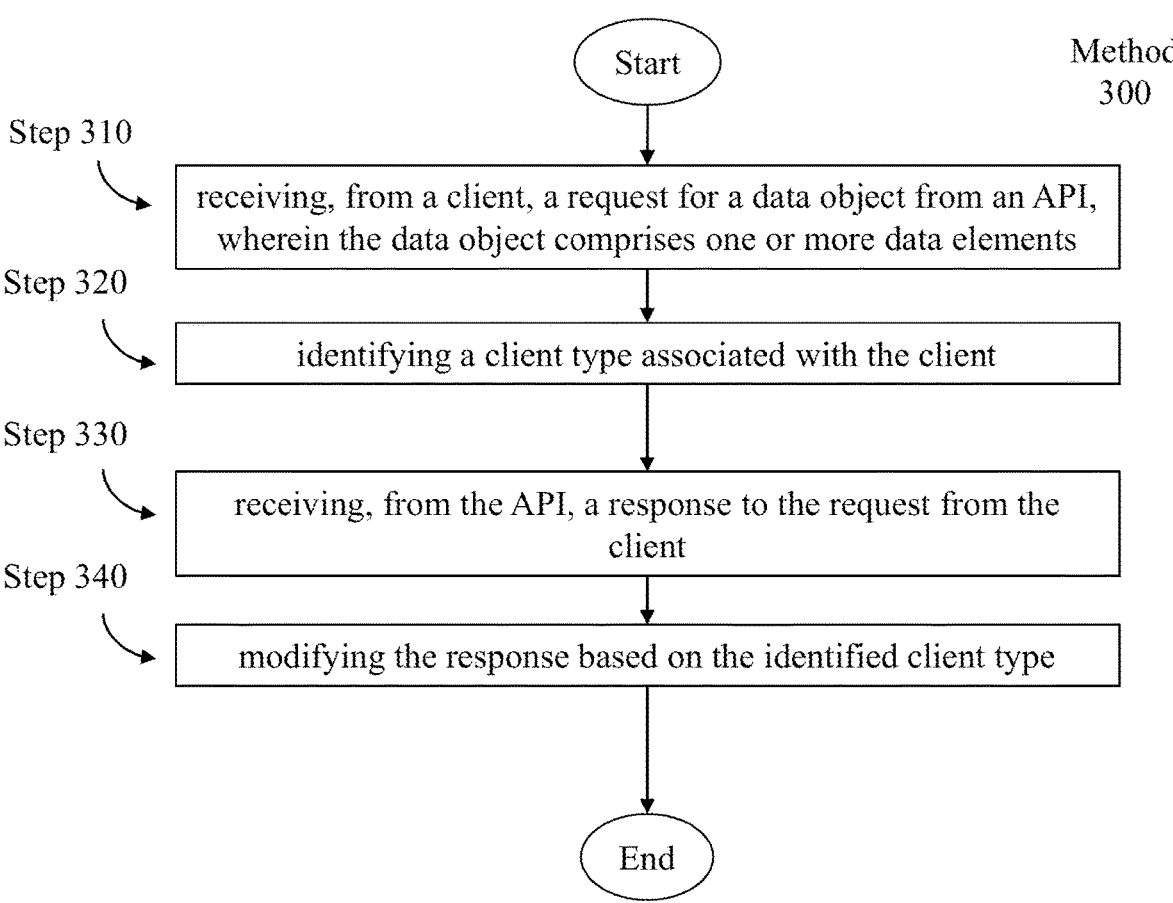
FIG. 3 illustrates a flow diagram of a method for minimizing data exposure in API responses, in accordance with certain embodiments.

Reference is now made to FIG. 3, which includes a flow diagram for a method 300 for minimizing data exposure in API responses, according to the present disclosure. At step 310, a proxy may receive from a client a request for a data object from an API. The data object may include one or more data elements. The request may request one or more services from an API. The client may request data objects or data elements for communication to one or more microservices. A proxy may receive a request directly from a client, indirectly from another proxy, or may intercept a request to an API from an API. A proxy may receive a request and identify an appropriate API for servicing the request.

At step 320, a proxy may identify a client type associated with the client. A proxy may identify a client type based on authentication mechanism, authorization mechanisms, or other mechanisms. To identify a client type, a proxy may receive credentials from the client and perform an authentication or authorization procedure. A proxy may perform an authentication procedure to identify a client type based on the client being an external client. A proxy may identify a client type by determining that the client uses one or more data elements. A proxy may identify a client type by determining that the client provides one or more data elements to one or more microservices. A proxy may identify a client type by identifying the microservice from which the request originated.

At step 330, a proxy may send a request 50 from the client to an API and receive, from an API, a response 60 to the request. Response 60 may include one or more data objects, including the data object requested by the client. The data object may include one or more data elements. The response is communicated by way of the API to the proxy. The client and server using and implementing the API can communicate with the proxy directly, indirectly from another proxy, or may intercept a response from an API to a client.

At step 340, a proxy may modify the response based on the identified client type. A proxy may modify a response to generate a modified response 70 for communication to the client, and a proxy may transparently communicate a modified response to the client. A proxy may modify a response by editing unused data elements. For example, a proxy may remove unused data elements to generate a modified response. As another example, a proxy may replace data elements to generate a modified response. A proxy may modify a response by removing optional data elements or replacing mandatory data elements. A proxy may modify a response based on one or more identified client types.

Figure 4:
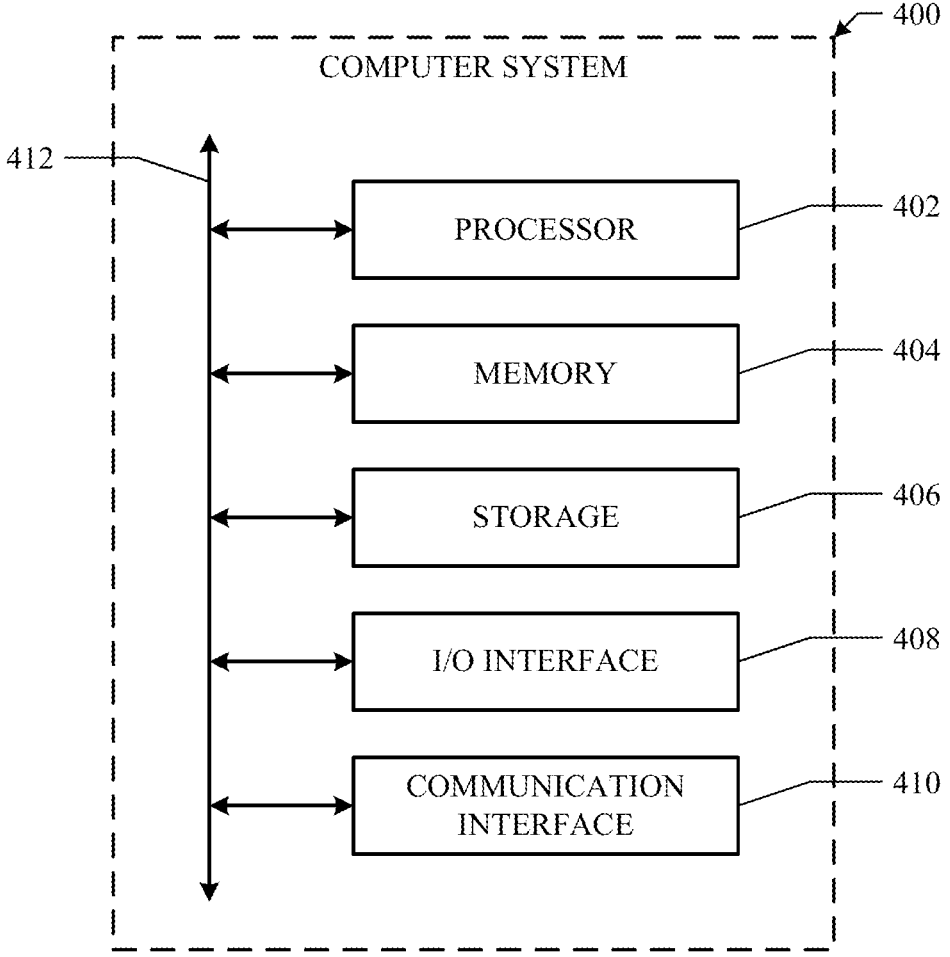
FIG. 4 illustrates a computer system where particular embodiments of the disclosure may be implemented.

Reference is now made to FIG. 4, which illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example, and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments according to the disclosure are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

What is claimed is:

1. A system, comprising:
a proxy device, comprising:
    one or more processors; and
    one or more computer-readable non-transitory storage media comprising instructions that, when executed by the one or more processors, cause one or more components of the proxy device to perform operations comprising:
        receiving, from a client, a request for a data object, wherein the data object comprises one or more data elements;
        determining, from the request, a microservice from which the request originated;
        identifying, based on the data object and the microservice, a client type associated with the client, wherein the client type indicates a type of microservices;
        receiving, from an application programming interface (API) located within a network, a response to the request from the client, wherein:
            the proxy device is external to the network; and
            the response comprises one or more data elements that are not used by the microservice from which the request originated and one or more data elements that are used by the microservice from which the request originated;
        modifying the response based on the client type, wherein modifying the response comprises customizing the response in accordance with the type of microservices to obfuscate the one or more data elements that are not used by the microservice from which the request originated while retaining the one or more data elements that are used by the microservice from which the request originated; and communicating the modified response directly to the client.

2. The system of claim 1, wherein identifying the client type further comprises:

receiving credentials from the client; and performing an authentication procedure to identify the client type.

3. The system of claim 2, wherein the authentication procedure is performed based on the client being an external client.

4. The system of claim 1, wherein identifying the client type further comprises determining that the client uses at least one of the one or more data elements.

5. The system of claim 4, wherein modifying the response comprises editing unused data elements.

6. The system of claim 1, wherein identifying the client type further comprises determining that the client provides the one or more data elements to one or more microservices.

7. The system of claim 1, wherein modifying the response comprises removing optional data elements from the response.

8. The system of claim 1, wherein modifying the response comprises replacing mandatory data elements in the response.

9. A method, comprising:

receiving, by a proxy device and from a client, a request for a data object, wherein the data object comprises one or more data elements;

determining, by the proxy device and from the request, a microservice from which the request originated;

identifying, by the proxy device and based on the data object and the microservice from which the request originated, a client type associated with the client, wherein the client type indicates a type of microservices;

receiving, by the proxy device and from an application programming interface (API) located within a network, a response to the request from the client, wherein:

the proxy device is external to the network; and the response comprises one or more data elements that are not used by the microservice from which the request originated and one or more data elements that are used by the microservice from which the request originated;

modifying, by the proxy device, the response based on the client type, wherein modifying the response comprises customizing the response in accordance with the type of microservices to obfuscate the one or more data elements that are not used by the microservice from which the request originated while retaining the one or more data elements that are used by the microservice from which the request originated; and communicating, by the proxy device, the modified response directly to the client.

10. The method of claim 9, wherein identifying the client type comprises:

receiving credentials from the client; and performing an authentication procedure to identify the client type.

11. The method of claim 10, wherein the authentication procedure is performed based on the client being an external client.

12. The method of claim 9, wherein identifying the client type further comprises determining that the client uses at least one of the one or more data elements of the data object.

13. The method of claim 12, wherein modifying the response comprises editing unused data elements.

14. The method of claim 9, wherein identifying the client type further comprises determining that the client provides the one or more data elements to one or more microservices.

15. The method of claim 9, wherein modifying the response comprises replacing mandatory data elements in the response.

16. One or more computer-readable non-transitory storage media embodying instructions that, when executed by a processor, cause performance of operations by a proxy device comprising:

receiving, from a client, a request for a data object, wherein the data object comprises one or more data elements;

determining, from the request, a microservice from which the request originated;

identifying, based on the data object and the microservice from which the request originated, a client type associated with the client, wherein the client type indicates a type of microservices;

receiving, by the proxy device and from an application programming interface (API) located within a network, a response to the request from the client, wherein:

the proxy device is external to the network; and the response comprises one or more data elements that are not used by the microservice from which the request originated and one or more data elements that are used by the microservice from which the request originated;

modifying the response based on the client type, wherein modifying the response comprises customizing the response in accordance with the type of microservices to obfuscate the one or more data elements that are not used by the microservice from which the request originated while retaining the one or more data elements that are used by the microservice from which the request originated; and communicating the modified response directly to the client.

17. The one or more computer-readable non-transitory storage media of claim 16, wherein identifying the client type comprises:

receiving credentials from the client; and performing an authentication procedure to identify the client type.

18. The one or more computer-readable non-transitory storage media of claim 16, wherein identifying the client type comprises determining that the client uses at least one of the one or more data elements of the data object.

19. The one or more computer-readable non-transitory storage media of claim 16, wherein identifying the client type further comprises determining that the client provides the one or more data elements to one or more microservices.

20. The one or more computer-readable non-transitory storage media of claim 16, wherein modifying the response comprises removing optional data elements from the response.

* * * * *